(12) United States Patent
Liu et al.

(10) Patent No.: US 11,340,717 B2
(45) Date of Patent: May 24, 2022

(54) PROCESSING APPARATUS AND PROCESSING SYSTEM

(71) Applicant: Lenovo (Beijing) Co., Ltd., Beijing (CN)

(72) Inventors: Jie Liu, Beijing (CN); Chun Ren, Beijing (CN); Zhou Yu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/586,973

(22) Filed: Sep. 28, 2019

(65) Prior Publication Data
US 2020/0103989 A1  Apr. 2, 2020

(30) Foreign Application Priority Data

Sep. 30, 2018  (CN) .......................... 201811161080.3

(51) Int. Cl.
*G06F 3/0354* (2013.01)

(52) U.S. Cl.
CPC ................................ *G06F 3/03545* (2013.01)

(58) Field of Classification Search
CPC .... G06F 13/00; G06F 3/03545; G06F 1/1632; G06F 1/1616; G06F 1/1654; G06F 2200/1632; G06F 2203/0384; H04M 1/0256
See application file for complete search history.

(56) References Cited

U.S. PATENT DOCUMENTS

| 6,525,932 B1 * | 2/2003 | Ohnishi ............... G06F 1/1607 235/430 |
| 7,102,626 B2 * | 9/2006 | Denny, III ............ G06F 1/1626 345/179 |
| 10,915,163 B2 * | 2/2021 | Tzou ..................... G06F 1/1618 |
| 11,048,346 B1 * | 6/2021 | Burks ................... G06F 1/1616 |
| 2009/0000832 A1 * | 1/2009 | Marggraff .......... G06F 3/03545 178/19.01 |
| 2009/0256955 A1 * | 10/2009 | Kuo .................... H04M 1/0264 348/376 |
| 2010/0250818 A1 * | 9/2010 | Gill ....................... G06F 1/1632 710/304 |
| 2011/0247247 A1 * | 10/2011 | Mayer ................. B42D 15/042 40/124.03 |

(Continued)

FOREIGN PATENT DOCUMENTS

| CN | 205356509 U | 6/2016 |
| CN | 207115266 U | 3/2018 |
| CN | 207637052 U | 7/2018 |

*Primary Examiner* — Nitin Patel
*Assistant Examiner* — Amen W Bogale
(74) *Attorney, Agent, or Firm* — Anova Law Group, PLLC

(57) ABSTRACT

The present disclosure provides a processing apparatus and a processing system, that the processing apparatus includes: a first main body having a first plane and a second plane adjacent to the first plane; a display device disposed on the first plane; and a first interface that is matched with a second interface of an acquisition apparatus, and is configured to obtain multimedia data collected by the acquisition apparatus from the second interface after the acquisition apparatus is detachably fixed to the second plane. The processing apparatus supports the accessory-type acquisition apparatus, which satisfies diversified use requirements.

11 Claims, 18 Drawing Sheets

(56) References Cited

U.S. PATENT DOCUMENTS

| | | | |
|---|---|---|---|
| 2014/0125606 A1* | 5/2014 | Namkung | G06F 1/1656 |
| | | | 345/173 |
| 2016/0005150 A1* | 1/2016 | Ghassabian | G06F 3/04886 |
| | | | 345/654 |
| 2016/0180805 A1* | 6/2016 | Konanur | G09G 5/006 |
| | | | 345/520 |
| 2016/0282964 A9* | 9/2016 | Kim | G06F 3/0383 |
| 2018/0292866 A1* | 10/2018 | Tucker | G06F 1/1686 |
| 2020/0183505 A1* | 6/2020 | Chen | G06F 3/0383 |

\* cited by examiner

PROCESSING APPARATUS AND PROCESSING SYSTEM

CROSS-REFERENCES TO RELATED APPLICATIONS

This application claims the priority of Chinese Patent Application No. 201811161080.3, filed on Sep. 30, 2018, the entire content of which is incorporated herein by reference.

FIELD OF THE DISCLOSURE

The present disclosure generally relates to the field of computer technology and, more particularly, relates to a processing apparatus and a processing system.

BACKGROUND

Currently, for providing electronic devices with a function of collecting multimedia data, acquisition apparatus for collecting multimedia data are integrated with the electronic devices. Such integration of the acquisition apparatus with the electronic devices can't meet diversified use requirements.

BRIEF SUMMARY OF THE DISCLOSURE

One aspect of the present disclosure provides a processing apparatus, including: a first main body, having a first plane and a second plane adjacent to the first plane; a display device, disposed on the first plane; and a first interface, that the first interface is matched with a second interface of an acquisition apparatus, and is configured to obtain multimedia data collected by the acquisition apparatus from the second interface after the acquisition apparatus is detachably fixed to the second plane.

Another aspect of the present disclosure provides a processing system, including: a processing apparatus and an acquisition apparatus. The processing apparatus includes: a first main body, a display device, and a first interface, that the first main body has a first plane and a second plane adjacent to the first plane, and the display device is disposed on the first plane. The acquisition apparatus includes a second interface, and the first interface is configured to obtain multimedia data collected by the acquisition apparatus from the second interface after the acquisition apparatus is detachably fixed to the second plane.

Other aspects of the present disclosure can be understood by those skilled in the art in light of the description, the claims, and the drawings of the present disclosure.

BRIEF DESCRIPTION OF THE DRAWINGS

To more clearly illustrate the technical solution in the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

DETAILED DESCRIPTION

The technical solutions in the embodiments of the present disclosure are described in the following with reference to the drawings in the embodiments of the present disclosure. The described embodiments are only a part of the embodiments of the present disclosure, and not all of the embodiments. All other embodiments obtained by a person of ordinary skill in the art based on the embodiments of the present disclosure without creative efforts are within the scope of the present disclosure.

Figure 1:
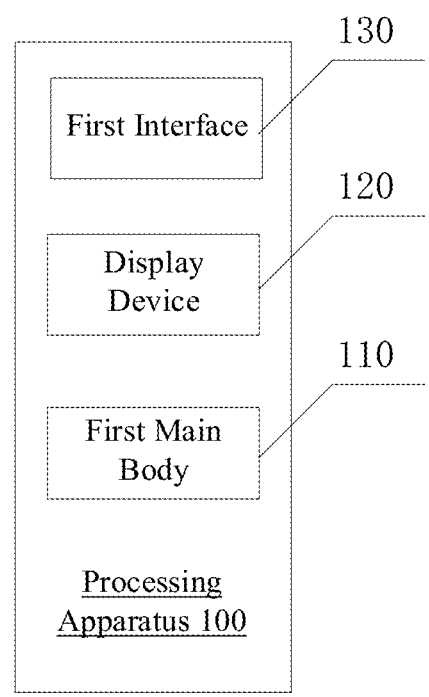
FIG. 1 is a schematic structural view of a processing apparatus according to some embodiments of the present disclosure.

A processing apparatus is provided in some embodiments of the present disclosure. As shown in FIG. 1, a processing apparatus 100 includes: a first main body 110, a display device 120, and a first interface 130.

The first main body 110 has a first plane and a second plane adjacent to the first plane, and the display device 120 is disposed on the first plane of the first main body 110.

The first interface 130 is matched with a second interface of an acquisition apparatus, and is configured to obtain multimedia data collected by the acquisition apparatus from the second interface after the acquisition apparatus is detachably fixed to the second plane. The first interface 130 may be disposed on the first main body 110, and may be disposed at other locations of the processing apparatus, which is not limited. The acquisition apparatus is provided with the second interface and can be connected to the first interface by a wired or wireless connection through the second interface. When the first interface is connected to the second interface by a wired connection, the connection may be through a cable connection, or a contact docking, such as a pin connection. If the first interface 130 of the processing apparatus is connected to the second interface of the acquisition apparatus through a contact docking, the first interface 130 is generally disposed on the second plane of the first main body 110 so that the acquisition apparatus is fixed on the second plane of the processing apparatus while the first interface is matched with the second interface.

The acquisition apparatus can collect multimedia data. Optionally, the acquisition apparatus can be a device having a camera function, and the multimedia data can be collected through the camera function. The multimedia data can be audio data, image data, or a combination of audio data and image data.

In the present disclosure, the processing apparatus can have a variety of configurations, for example, the processing apparatus includes only a first main body, or the processing apparatus includes a first main body and a second main body coupled to the first main body by a connector. Regardless of the configurations, the following structures can be realized.

Figure 2A:
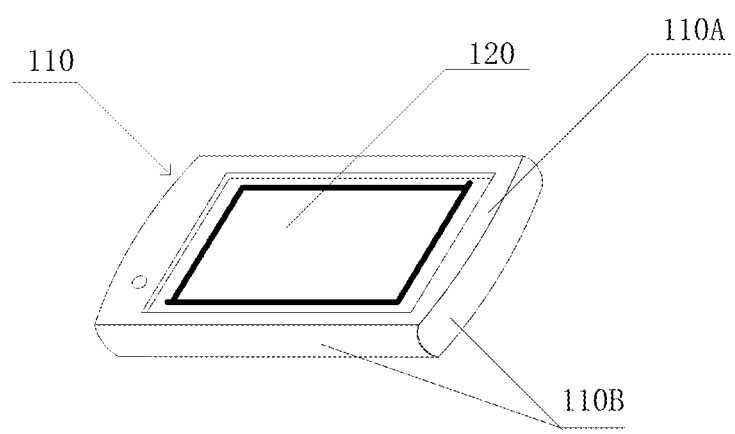
FIG. 2a is a schematic structural view of a first main body having a first plane and a second plane according to some embodiments of the present disclosure.

In one structure as shown in FIG. 2a, a first plane 110A of a first main body 110 is a front side of the first main body, and is provided with a display device 120. A second plane 110B of the first main body 110 is a side end of the first main body, that is, an acquisition apparatus can be fixed on the side end of the first main body 110.

Figure 2B:
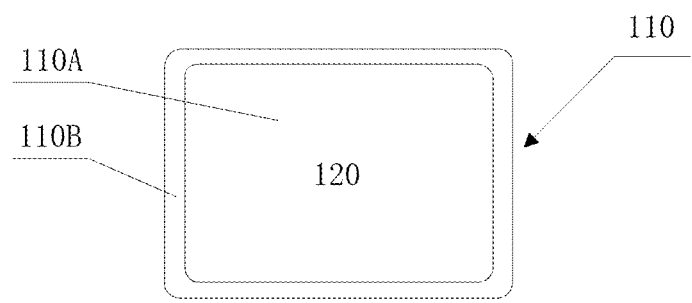
FIG. 2b is a schematic structural view of another first main body having a first plane and a second plane according to some embodiments of the present disclosure.

In another structure as shown in FIG. 2b, a first plane 110A and a second plane 110B of a first main body 110 are located on a same surface of the first main body. The first plane 110A is a front central area of the first main body, and is provided with a display device 120. The second plane 110B is a surrounding area of the first plane 110A, that is, an acquisition apparatus can be fixed on a front frame area of the first main body 110.

FIG. 2a and FIG. 2b only show a first main body of an electronic device, which does not constitute a limitation that the electronic device only includes the first main body, and the electronic device may further include a second main body.

Therefore, in the present disclosure, a processing apparatus can use a detachable acquisition apparatus to collect multimedia data, that is, the acquisition apparatus can be used as an accessory apparatus of the processing apparatus, and the processing apparatus supports the accessory-type acquisition apparatus, which satisfies diversified use requirements.

Figure 3:
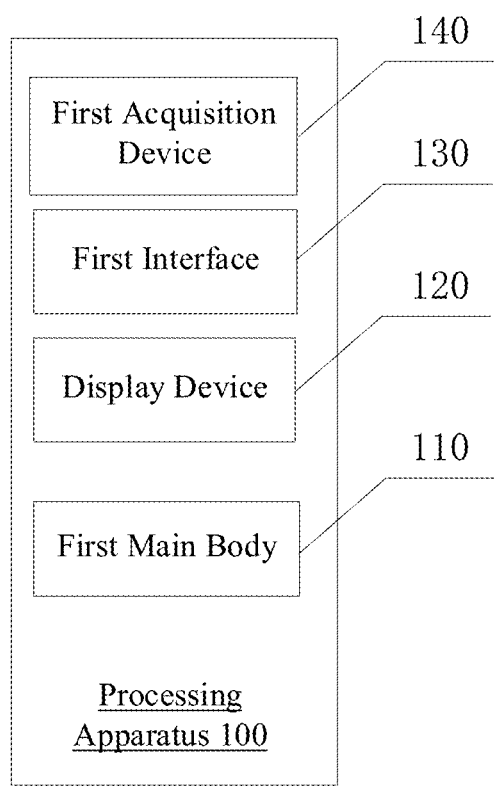
FIG. 3 is a schematic structural view of another processing apparatus according to some embodiments of the present disclosure.

Different from other embodiments, as shown in FIG. 3, a processing apparatus provided in some embodiments of the present disclosure further includes a first acquisition device 140. The first acquisition device 140 may be disposed on a first main body 110 of the processing apparatus, or may be disposed at other locations of the processing apparatus. For example, if the processing apparatus further includes a second main body, the first acquisition device 140 can also be disposed on the second main body of the processing apparatus.

An acquisition apparatus may have a second acquisition device, and the second acquisition device is configured to collect multimedia data. The first acquisition device 140 has a different acquisition function from the second acquisition device of the acquisition apparatus. Although the processing apparatus also has the first acquisition device 140 with the acquisition function, the acquisition function is different from an acquisition function of the second acquisition device of the acquisition apparatus. For example, the acquisition function of the second acquisition device of the acquisition apparatus may be an image acquisition function, and the acquisition function of the first acquisition device may be a voice acquisition function. In this case, the first acquisition device can be a microphone and the second acquisition device can be a camera.

In some embodiments of the present disclosure, only a first acquisition device of a processing apparatus has an acquisition function, that is, the first acquisition device is an only device having an acquisition function of the processing apparatus. Alternatively, the processing apparatus does not have an acquisition device with a same acquisition function as an acquisition apparatus for collecting multimedia data. For example, if a second acquisition device is a camera, the processing apparatus does not have a camera.

In some embodiments, a processing apparatus further includes a second main body, and a connector, that the connector is configured to connect a first main body and the second main body, and is configured to implement a change of a relative positional relationship between the first main body and the second main body. Optionally the connector may be a rotating shaft.

The second main body may be a main body provided with an input device, such as a keyboard. Or the second main body may also be a main body provided with another display device, and display devices disposed on the first main body and the second main body may each be a touch display screen. Alternatively, the second main body acts only as a host for the processing apparatus.

The connector is configured to implement a relative position change of the first main body and the second main body, and the relative position change may be a 360 degree rotation between the first main body and the second main body, or a rotation of 0 degree to a specific degree, for example, 0 degree to 120 degree.

Figure 4A:
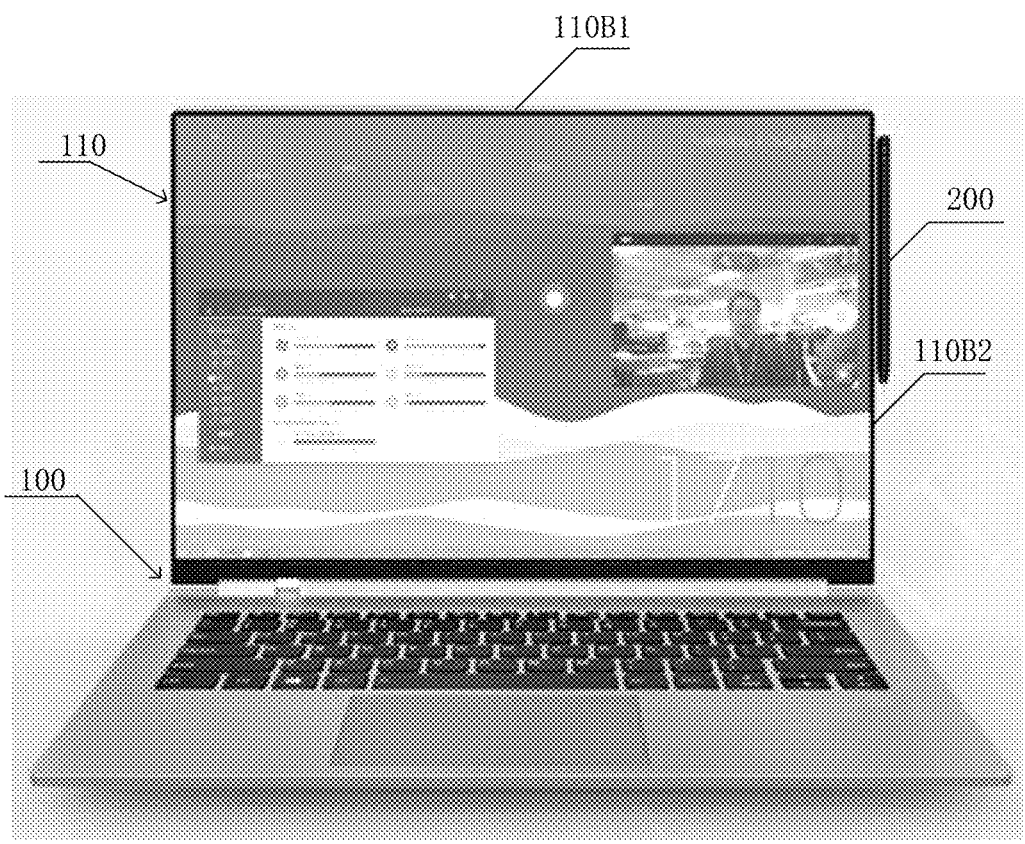
FIG. 4a is a schematic structural view of a processing apparatus configured with an acquisition apparatus according to some embodiments of the present disclosure.
Figure 4B:
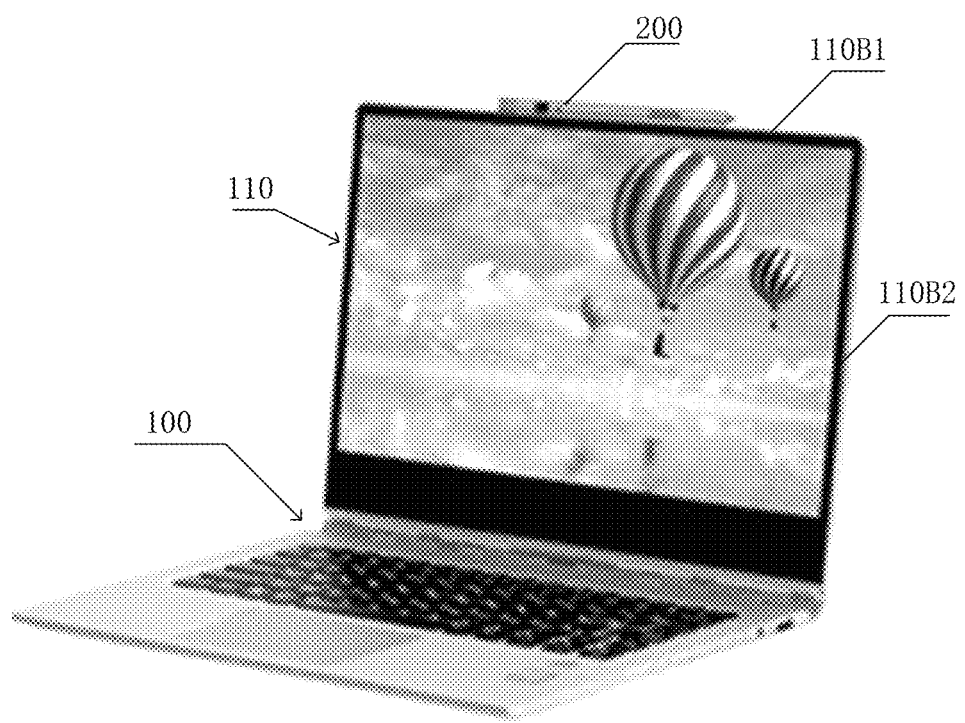
FIG. 4b is a schematic structural view of another processing apparatus configured with an acquisition apparatus according to some embodiments of the present disclosure.
Figure 4C:
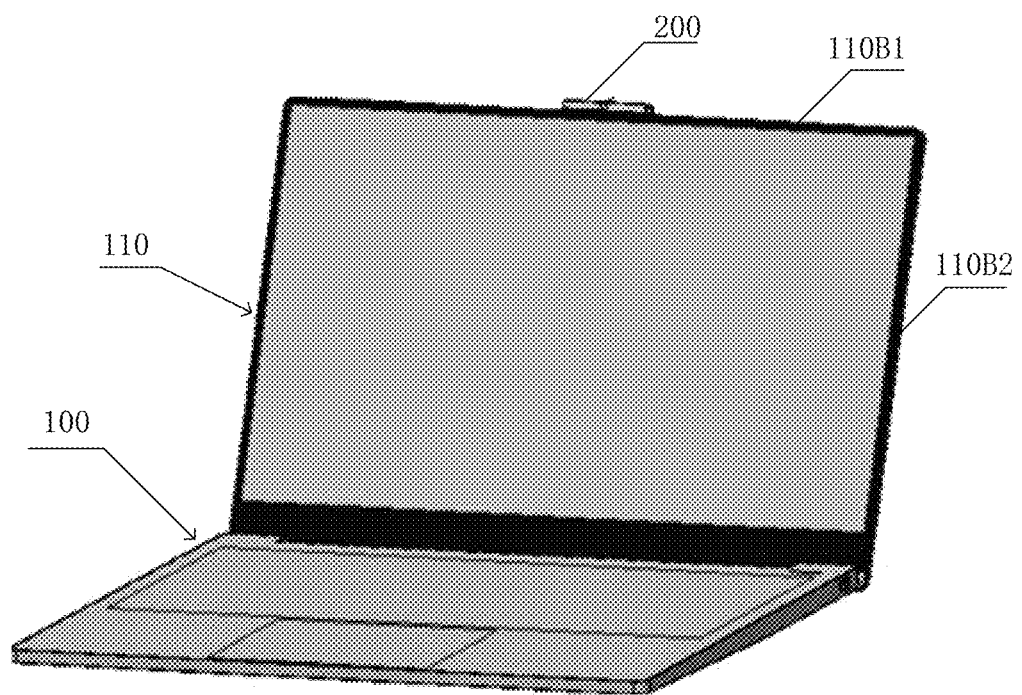
FIG. 4c is a schematic structural view of another processing apparatus configured with an acquisition apparatus according to some embodiments of the present disclosure.

In a configuration in which a processing apparatus includes a first main body and a second main body connected to the first main body, optional implementations of a first plane and a second plane are described, referring to FIGS. 4a-4c. A first main body 110 of a processing apparatus 100 includes a first side end 110B1 and a second side end 110B1. The first side end 110B1 is an end of the first main body away from a connector, and the second side end 110B2 is an end of the first main body 110 adjacent to the first side end 110B1.

A second plane corresponds to the first side end 110B1 or corresponds to the second side end 110B2. When the second plane corresponds to the first side end 110B1, an installation position of an acquisition apparatus 200 can be referred to FIG. 4b and FIG. 4c. When the second plane corresponds to the second side end 110B2, an installation position of the acquisition apparatus 200 can be referred to FIG. 4a.

As shown in FIGS. 4a-4c, the acquisition apparatus 200 has two or more forms, and a few optional forms will be described later.

In a configuration, in which a processing apparatus includes a first main body and a second main body connected to the first main body, as other implementations of a first plane and a second plane, reference may be made to previously described embodiments corresponding to FIG. 2b. In some embodiments, a first plane and a second plane of a first main body are both located on a same surface of the first main body. The first plane is a front central area of the first main body, and is provided with a display device. The second plane is a surrounding area of the first plane, that is, an acquisition apparatus can be fixed to a front frame area of the first main body. In this implementation manner, when a user uses the electronic device, the user is located in a collection area corresponding to the acquisition apparatus, so that multimedia data collected by the acquisition apparatus conforms to the user's perspective, thereby improving quality of the collected multimedia data, compared to an acquisition apparatus integrated on a keyboard side of an electronic device.

In some embodiments, a processing apparatus further includes: a first fixing device, where the first fixing device is disposed on a second plane, and is configured to fix an acquisition apparatus after a first interface matches a second interface.

A second fixing device may be disposed on the acquisition apparatus for matching with the first fixing device to fix the acquisition apparatus on the second plane.

In some embodiments, the first fixing device and the first interface, as well as the second fixing device and the second interface, may have multiple implementations, which are separately described below.

In one implementation, the first fixing device is different from the first interface, the second fixing device is different from the second interface, and the first interface is in a contact connection with the second interface of the acquisition apparatus to achieve matching.

Figure 5A:
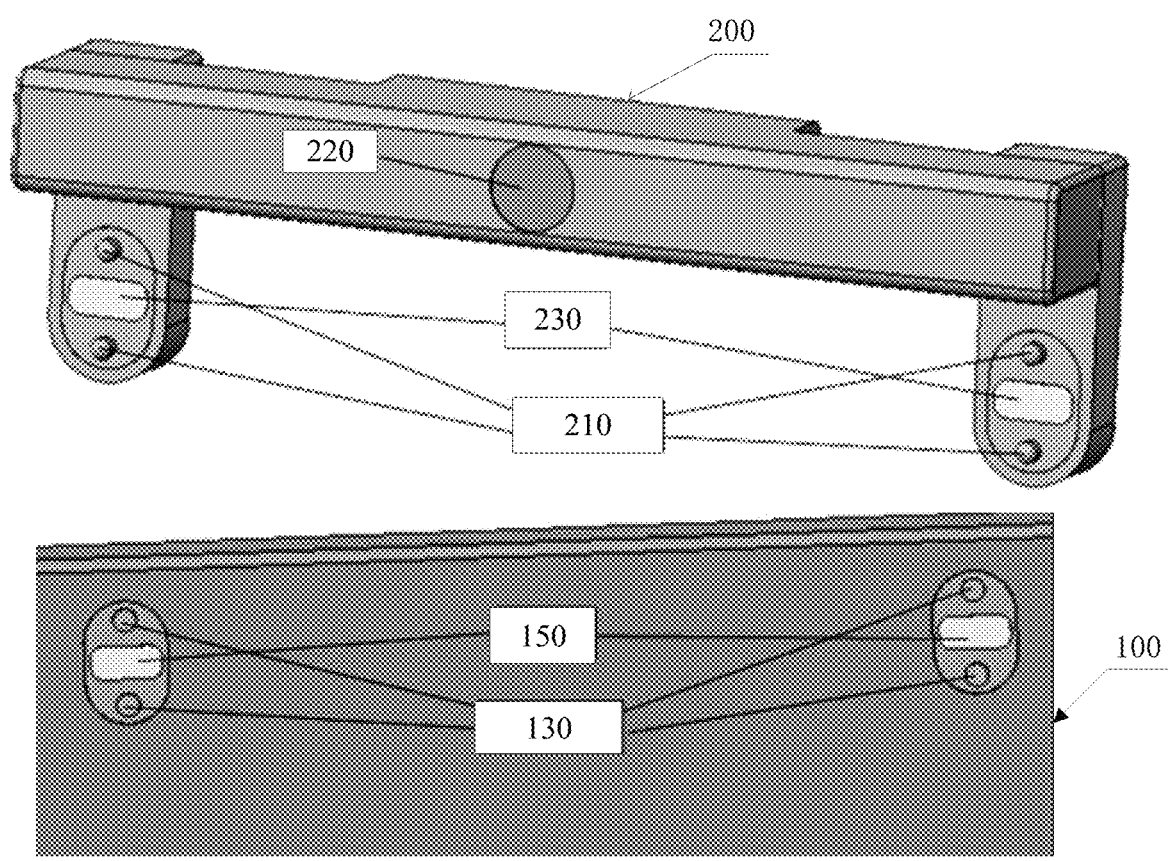
FIG. 5a is a schematic structural view of a first interface and a first fixing device on a processing apparatus, and a second interface and a second fixing device on an acquisition apparatus, according to some embodiments of the present disclosure.

As shown in FIG. 5a, when a first interface 130 of a processing apparatus 100 matches a second interface 210 of an acquisition apparatus 200, a first fixing device 150 of the processing apparatus 100 is fixedly connected with a second fixing device 230 of the acquisition apparatus 200 to fix the acquisition apparatus 200 on the processing apparatus 100.

Optionally, a first interface 130 and a second interface 210 may be a USB interface, such as a USB 2.0 interface. A first fixing device 150 and a second fixing device 230 can achieve a fixing connection by magnetic attraction, such as the first fixing device 150 and the second fixing device 230 being two magnetic pieces of opposite polarities.

In another implementation, a first fixing device is different from a first interface, a second fixing device is different from a second interface, and the first interface and the second interface of an acquisition apparatus are matched by a wireless connection.

Figure 5B:
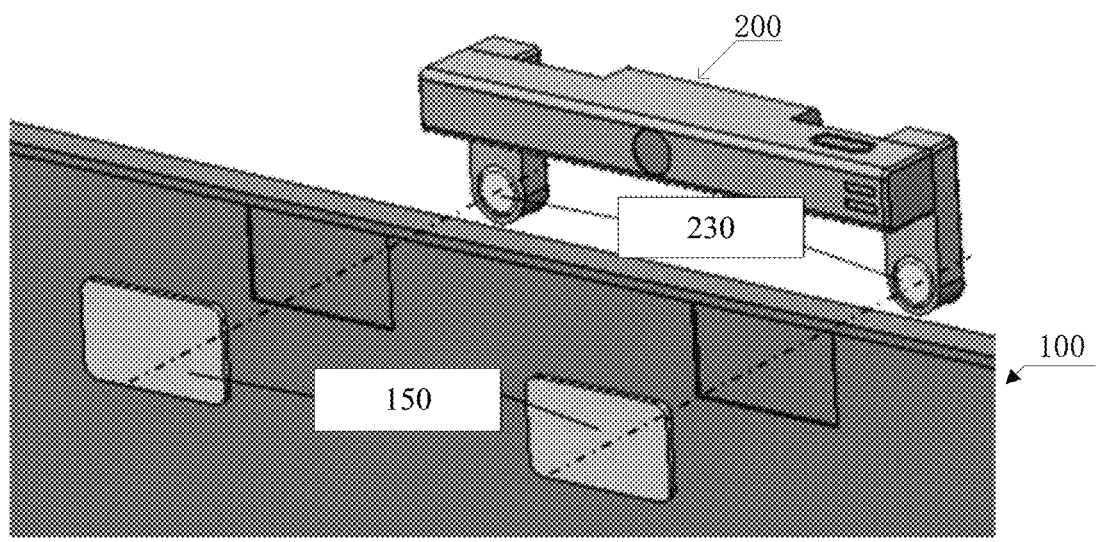
FIG. 5b is a schematic structure view of a first fixing device on a processing apparatus and a second fixing device on an acquisition apparatus, according to some embodiments of the present disclosure.

As shown in FIG. 5b, since a first interface and a second interface are matched by a wireless connection, when an acquisition apparatus 200 is disposed on a processing apparatus 100, only matching between two fixing devices is considered.

Optionally, the first fixing device 150 and the second fixing device 230 may achieve a fixing connection by magnetic attraction, such as the first fixing device and the second fixing device being two magnetic pieces of opposite polarities.

In another implementation, a first fixing device is used as a first interface, and a second fixing device is used as a second interface.

That is, the first interface and the second interface serve both as a matching function and as a fixing function. Optionally, referring to FIG. 5c, a first interface and a second interface are both annular magnetic connectors, which realize a function of fixing an acquisition apparatus 200 to a processing apparatus 100 while being connected.

Figure 5C:
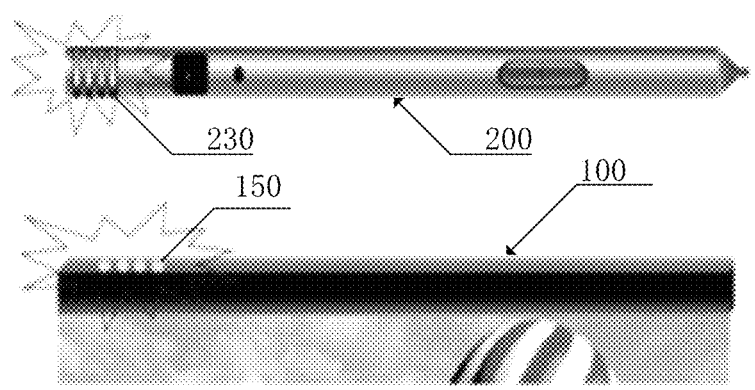
FIG. 5c is a schematic structural view of a first interface and a first fixing device on another processing apparatus, and a second interface and a second fixing device on another acquisition apparatus, according to some embodiments of the present disclosure.

FIGS. 5a-5c are examples for describing a fixing device and a interface, which do not constitute a limitation of the present disclosure.

In an actual application, when an acquisition apparatus is fixed on a second plane of a first main body of a processing apparatus, to satisfy a multi-angle requirement of a user, for example, when the user uses the processing apparatus to perform a video chat with other users, to enable other user to see multiple orientations, or to avoid other users seeing current orientation, there is a need for a multi-angle rotation. To meet the multi-angle requirement of the user, in some embodiments of the present disclosure, a first fixing device is configured to enable an acquisition apparatus to face two or more directions while keeping the acquisition apparatus fixed to the second plane.

As one implementation, as shown in FIG. 5c, a first fixing device 150 is used as a first interface. The second fixing device is used as the second interface. The first and second fixing devices may be magnetic connectors. For example, since the first interface is a ring-shaped magnetic connector, matching of the first interface and a second interface can be ensured, while rotating at multiple angles and ensuring a magnetic fixing.

As another implementation, also referring to FIG. 5c, a first fixing device 150 is different from a first interface. The second fixing device is different from a second interface.

The first and second fixing devices may be magnetic connectors. For example, the first fixing device 150 and a second fixing device 230 are ring-shaped magnetic fixing devices, and the first interface and a second interface make a matching connection by a wireless connection.

In another implementation, an acquisition apparatus may be provided with a rotating structure. Optionally, the acquisition apparatus may include a first main body provided with a second fixing device and a second main body configured with a second acquisition device, and the second main body may be configured to rotate by taking the first main body as an axis. After the second fixing device is secured to the first fixing device, a user can rotate the second main body of the acquisition apparatus to enable the second acquisition device to be oriented in two or more directions.

In some embodiments, an acquisition apparatus is fixed under a second plane of a processing apparatus and can rotate in two or more directions, which satisfies a requirement for a user to collect multimedia data in multiple directions. Moreover, when a collection area of the acquisition apparatus is facing the user, if the user needs to protect the privacy, the acquisition apparatus can be rotated downward, so that the collection area of the acquisition apparatus faces a body of the processing apparatus, thereby ensuring that the collection area of the acquisition apparatus is no longer facing the user, to protect the privacy of users.

In a processing apparatus provided in some embodiments of the present disclosure, a first main body has a first surface, the first surface includes a first plane, and the first plane is provided with a display device, and a ratio of the first plane to the first surface exceeds a threshold.

Figure 6:
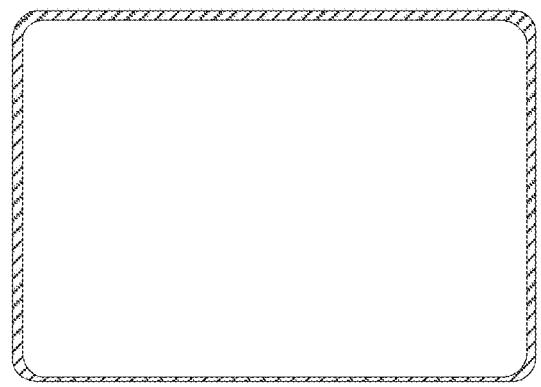
FIG. 6 is a schematic structural view of a first plane and a first surface provided on a first main body according to some embodiments of the present disclosure.

As shown in FIG. 6, a first surface includes a filled area and a white area. The white area as a first plane is provided with a display screen, and a ratio of the first plane to the first surface exceeds a threshold. To reflect a narrow frame design or a full screen design of a processing apparatus, the threshold is generally set relatively high, such as a predetermined threshold of 85%, 90%, and the like.

In the foregoing embodiments, a first main body includes a first plane and a second plane, and the first plane and the second plane may both be located on a same surface of the first main body. In some embodiments, a first surface includes a first plane and a second plane, that the second plane can be a filled area as shown in FIG. 6.

To further embody a narrow frame design of a processing apparatus, in the processing apparatus, a circuit device connected to a display device is disposed on a first main body, and the circuit device and the display device overlap in a direction perpendicular to the display device. That is, some or all of the circuit devices disposed at an edge of the first main body may be folded to a back of the display device.

For a processing apparatus integrated with an acquisition apparatus for collecting multimedia data, the acquisition apparatus is generally disposed at a frame region of a first surface of a first main body of the processing apparatus, on which a display screen is disposed. Therefore, requirements for the processing apparatus are higher. In one implementation, the first surface of the first main body needs to have a relatively wide frame area for placing the acquisition apparatus, thereby making the display screen smaller on the first surface. In another implementation, the display screen of the processing apparatus is a profiled-shape screen. Either implementation, the electronic device is limited to a direction of a narrow frame. In the present disclosure, an acquisition apparatus is fixed on a processing apparatus in a form of an accessory, to collect multimedia data, so that the processing apparatus can achieve the effect of a narrow frame.

To facilitate the carrying of an acquisition apparatus, a processing apparatus is provided in some embodiments of the present disclosure. A processing apparatus 100 is provided with a receiving cavity for accommodating an acquisition apparatus 200 when a first interface is not matched with a second interface.

Optionally, the receiving cavity may be disposed on a first main body of the processing apparatus 100. If the processing apparatus includes a second main body, the receiving cavity may also be disposed on the second main body.

Figure 7A:
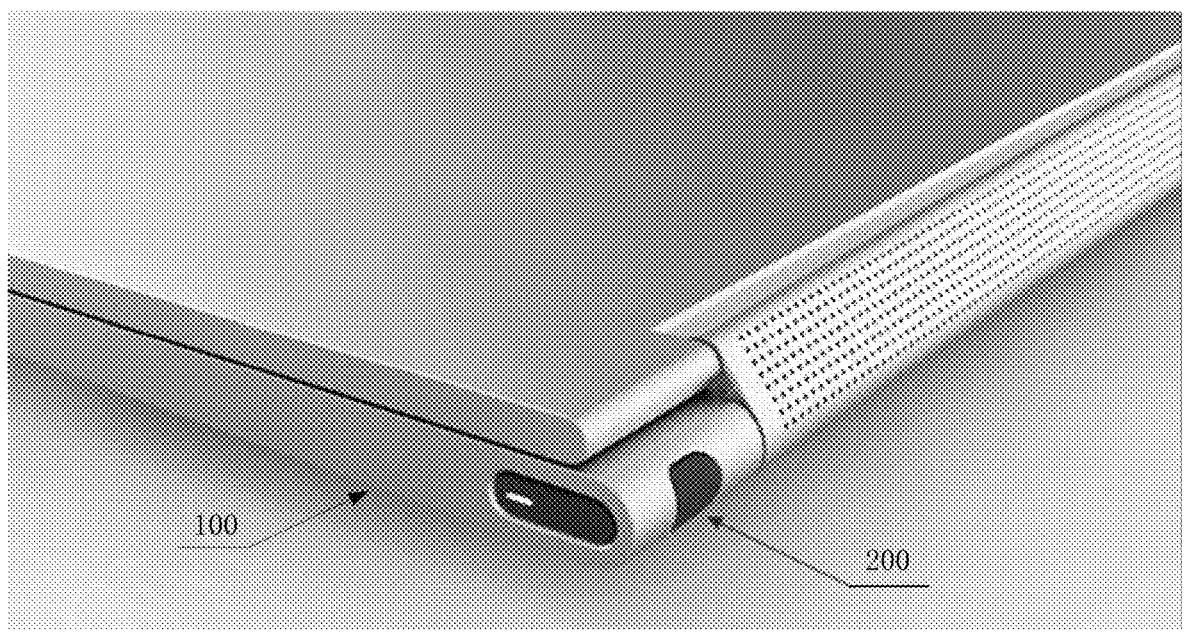
FIG. 7a is a schematic structural view of a processing apparatus accommodating an acquisition apparatus according to some embodiments of the present disclosure.

A schematic structural view of an acquisition apparatus 200 accommodated in a receiving cavity on a second main body of a processing apparatus 100 is illustrated in FIG. 7a. When the acquisition apparatus 200 is required, the acquisition apparatus 200 can be removed from the receiving cavity. To facilitate removal of the acquisition apparatus, the receiving cavity and the acquisition apparatus can be arranged to use a push pop-up structure.

Figure 7B:
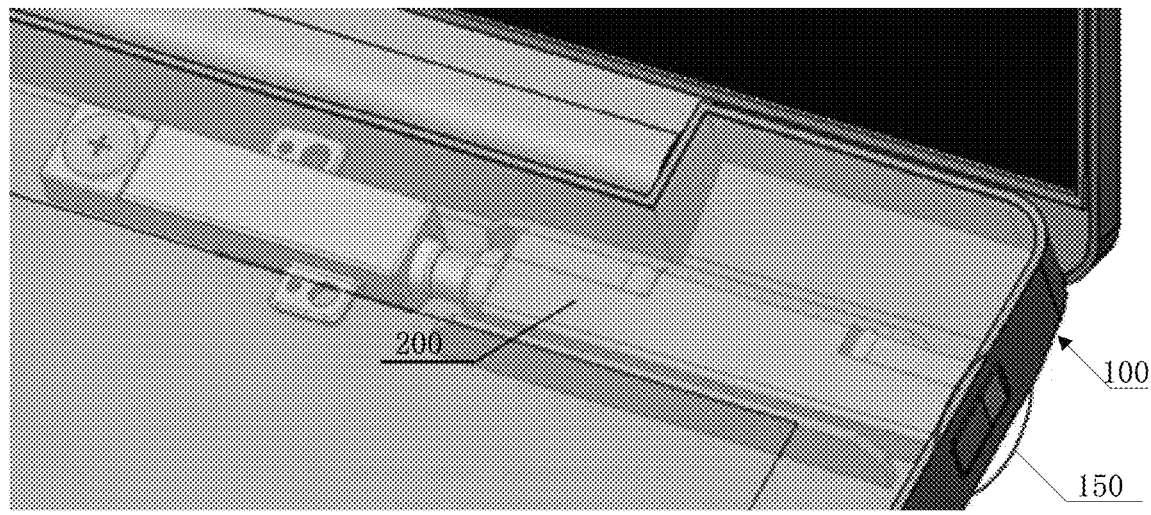
FIG. 7b is a schematic structural view of another processing apparatus accommodating an acquisition apparatus according to some embodiments of the present disclosure.

FIG. 7b shows a structural schematic of an acquisition apparatus 200 accommodated in a receiving cavity 150 on a second main body of another processing apparatus 100. The acquisition apparatus shown in FIG. 7b has a different form as the acquisition apparatus shown in FIG. 7a.

An acquisition apparatus needs to use electrical energy when collecting multimedia data. In some embodiments, the acquisition apparatus may be provided with a battery module to provide power through the battery module. In some embodiments, the acquisition apparatus does not have a battery module. In this case, a processing apparatus can supply power to the acquisition apparatus when a second interface of the acquisition apparatus is wired to a first interface of the processing apparatus. If the acquisition apparatus is provided with a battery module, when the second interface of the acquisition apparatus is wired with the first interface of the processing apparatus, the processing apparatus supplies power to the battery module of the acquisition apparatus, or to a second acquisition device (a device that collects multimedia data) of the acquisition apparatus.

When an acquisition apparatus has a battery module, as a preferred embodiment, the acquisition apparatus can be charged by a processing apparatus when the acquisition apparatus is accommodated in a receiving cavity of the processing apparatus. A first charging pin is disposed in the receiving cavity for interfacing with a second charging pin on the acquisition apparatus when the acquisition apparatus is accommodated, so that the processing apparatus supplies power to the battery module of the acquisition apparatus. The second charging pin is connected to the battery module, and the first charging pin of the processing apparatus is connected to a power device of the processing apparatus.

Figure 8:
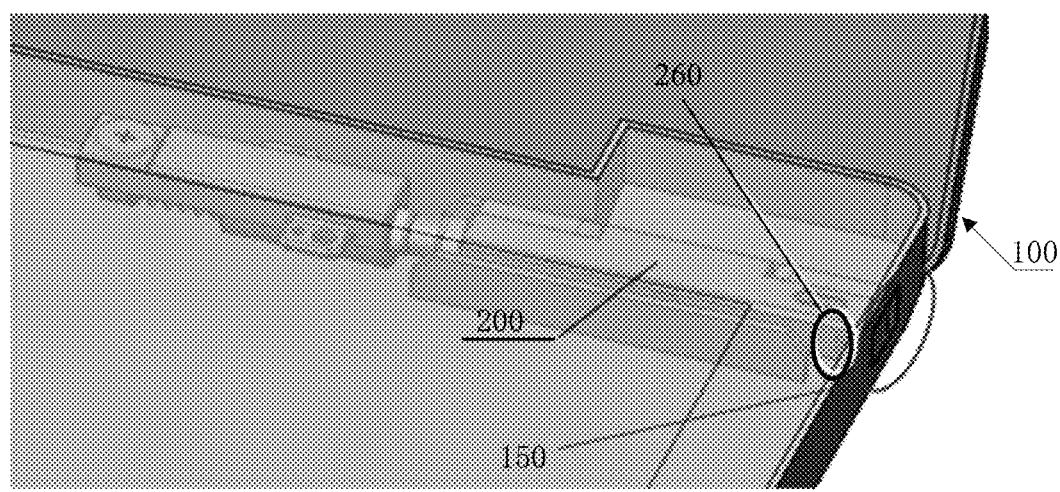
FIG. 8 is a schematic structural view of another processing apparatus accommodating an acquisition apparatus according to some embodiments of the present disclosure.

As shown in FIG. 8, after an acquisition apparatus 200 is accommodated in a receiving cavity 150, a second charging pin 260 on the acquisition apparatus 200 is connected to a first charging pin (not shown) provided in the receiving cavity 150.

The second charging pin of the acquisition apparatus can also be connected to a separate power supply.

In some embodiments of the present disclosure, a processing apparatus further includes a sensing device. The sensing device is configured to determine a position of an acquisition apparatus relative to the sensing device, when the processing apparatus and the acquisition apparatus meet a positional relationship.

The sensing device can be a sensing unit disposed on a display device. Optionally, the sensing device and the display device can constitute a touch display screen.

When a specific part of the acquisition apparatus contacts the sensing device, the sensing device can collect position information of the specific part of the acquisition apparatus relative to the sensing device, such as touch sliding information.

Optionally, the acquisition apparatus may have a first end. When the first end is in contact with the sensing device, the sensing device can recognize the touch operation of the first end. In other words, the acquisition apparatus further includes a function module having a first function, which is a function that the function module can generate a trajectory through the first end.

An acquisition apparatus in some embodiments of the present disclosure may be in a form of a stylus, as shown in FIGS. 4a, 4b, and 5c, as well as FIG. 11, FIG. 12, FIG. 14, FIG. 19, and so on, which will be described later. Existing accessories with high frequency of use can be reused as an acquisition apparatus, which can improve the degree of acceptance of the acquisition apparatus by users, and the accessory type conforms to the users' usage habits. Further, the acquisition apparatus in the present disclosure has advantages of light weight, easy to rotate, and natural appearance, compared to other accessories, such as an adapter and a mouse. For example, a form of a stylus shape is generally columnar, and the acquisition apparatus can also be designed as a columnar shape, therefore it is not only convenient for the user to rotate in multiple directions, but also the structure is beautiful, and a fixing device is relatively natural and unobtrusive.

The present disclosure also provides a processing system, which is illustrated below by some embodiments.

Figure 9:
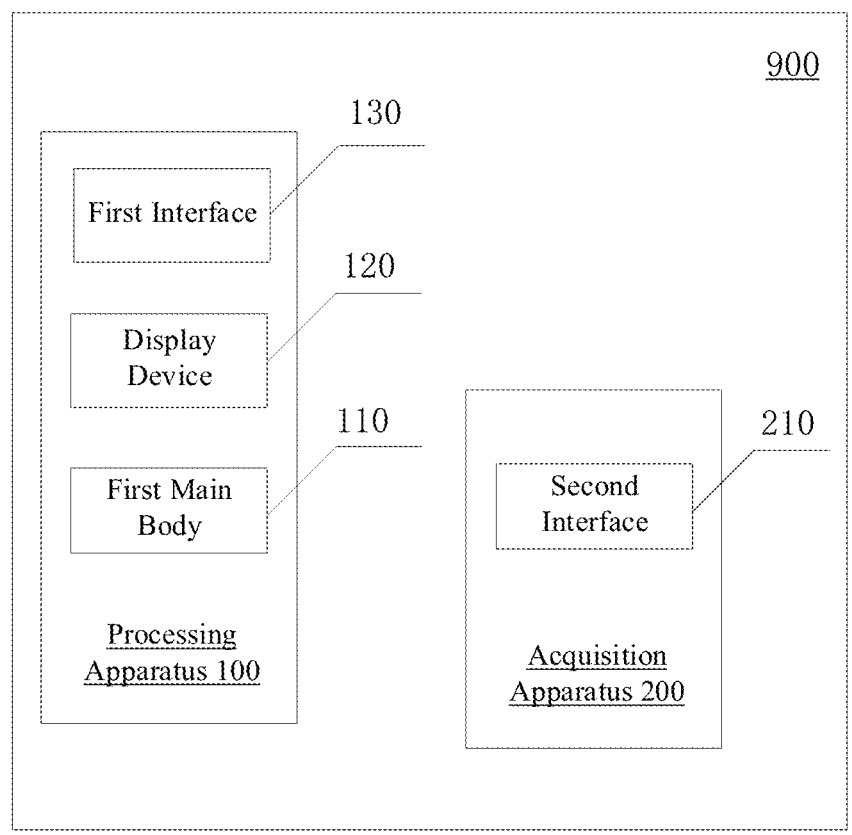
FIG. 9 is a schematic structural view of a processing system according to some embodiments of the present disclosure.

A processing system is provided in some embodiments of the present disclosure. As shown in FIG. 9, a processing system 900 includes a processing apparatus 100 and an acquisition apparatus 200.

The processing apparatus 100 includes a first main body 110, a display device 120, and a first interface 130. The first main body 110 has a first plane and a second plane adjacent to the first plane, and the display device is disposed on the first plane.

The acquisition apparatus 200 includes a second interface 210.

When the first interface 130 is matched with the second interface 210, and the acquisition apparatus 200 is detachably fixed to the second plane of the processing apparatus 100, the first interface 130 can be used to obtain multimedia data collected by the acquisition apparatus from the second interface 210.

In the processing system of the present disclosure, the processing apparatus can use the detachable acquisition apparatus to collect multimedia data, that is, the acquisition apparatus can be used as an accessory apparatus of the processing apparatus, and the processing apparatus supports the accessory-type acquisition apparatus, which satisfies diversified use requirements.

Regarding the structure of the processing apparatus in the processing system, reference may be made to the foregoing description of the processing apparatus, and details are not repeated herein. Optional structure of the acquisition apparatus in the processing system will be described below through some embodiments, and partial structure of the acquisition apparatus is also described in the description of the processing apparatus, which can be referred to together.

Figure 10:
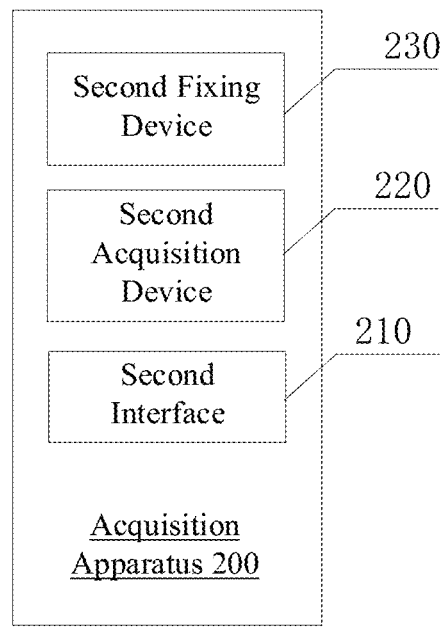
FIG. 10 is a schematic structural view of an acquisition apparatus according to some embodiments of the present disclosure.

An acquisition apparatus is provided in some embodiments of the present disclosure. As shown in FIG. 10, an acquisition apparatus 200 includes a second interface 210, a second acquisition device 220, and a second fixing device 230.

The second acquisition device 220 is configured to collect multimedia data.

The second interface 210 can be matched with a first interface of a processing apparatus to fix the acquisition apparatus to a second plane of the processing apparatus, so that the processing apparatus obtains the multimedia data collected by the acquisition apparatus from the second interface.

The second fixing device 230 and a first fixing device of the processing apparatus are configured to fix the acquisition apparatus when the second interface 210 matches the first interface of the processing apparatus.

The processing apparatus may include a first fixing device, and the first fixing device is disposed on the second plane of the processing apparatus.

In an actual application, when an acquisition apparatus is fixed on a second plane of a first main body of a processing apparatus, to satisfy a multi-angle requirement of a user, as an implementation manner, a first fixing device is configured to enable the acquisition apparatus to face two or more directions while keeping the acquisition apparatus fixed to the second plane.

Figure 11:
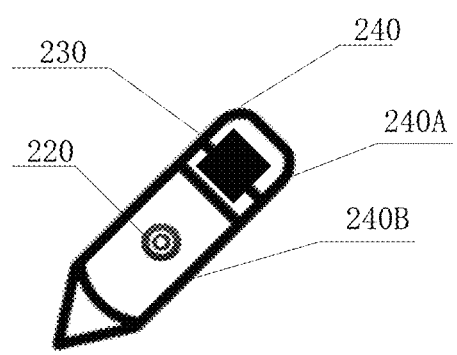
FIG. 11 is a schematic structural view of another acquisition apparatus according to some embodiments of the present disclosure.

As a further implementation, a second fixing device is configured to enable the acquisition apparatus to face two or more directions while keeping the acquisition apparatus fixed to the second plane. In this implementation, as an optional structure, as shown in FIG. 11, an acquisition apparatus includes an acquisition apparatus main body 240. The acquisition apparatus main body 240 includes a first main body 240A and a second main body 240B. A second fixing device 230 is configured on the first main body 240A, a second acquisition device 220 for collecting multimedia data is disposed on the second main body 240B, and the second main body 240B can be rotated at multiple angles with the first main body 240A as an axis. Therefore, after the second fixing device 230 being secured to a first fixing device of a processing apparatus, a user can enable the second acquisition device 220 to face two or more directions by rotating the second main body 240B of the acquisition apparatus.

As an optional structure, the second fixing device can be matched with the first fixing device as a ring-shaped magnetic fastening device or a ring-shaped magnetic connector. For details, refer to the foregoing description, and the description is not repeated here.

In some embodiments, an acquisition apparatus is fixed under a second plane of a processing apparatus and can rotate in two or more directions, which satisfies a requirement for a user to collect multimedia data in multiple directions. Moreover, when a collection area of the acquisition apparatus is facing the user, if the user needs to protect the privacy, the acquisition apparatus can be rotated downward, so that the collection area of the acquisition apparatus faces a body of the processing apparatus, thereby ensuring that the collection area of the acquisition apparatus is no longer facing the user, to protect the privacy of users.

Figure 12:
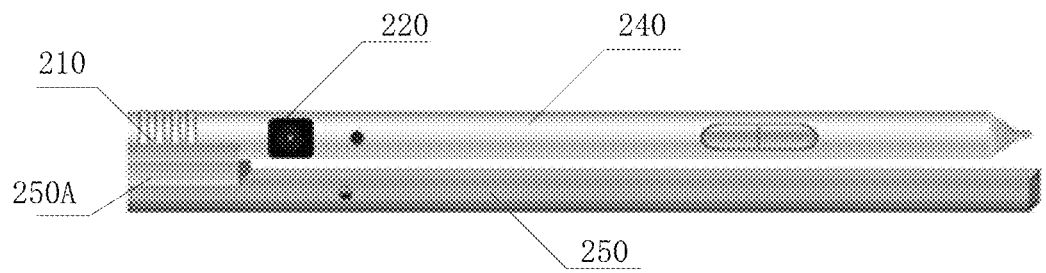
FIG. 12 is a schematic structural view of another acquisition apparatus according to some embodiments of the present disclosure.

An acquisition apparatus is provided in some embodiments of the present disclosure. As shown in FIG. 12, an acquisition apparatus includes: a second interface 210, a second acquisition device 220, an acquisition apparatus main body 240, and a base 250. The second interface 210 is disposed on the acquisition apparatus main body 240 of the acquisition apparatus.

A third interface 250A is disposed on the base 250.

When the second interface 210 is connected to the third interface 250A, the base 250 is configured to provide the acquisition apparatus with one or more first functions that are different from an acquisition function of the second acquisition device to collect multimedia data.

The second interface 210 and the third interface 250A may be wired connection interfaces or wireless connection interfaces, which are not limited in the present disclosure.

The base 250 is configured to provide one or more first functions different from an acquisition function to the acquisition apparatus.

Figure 13:
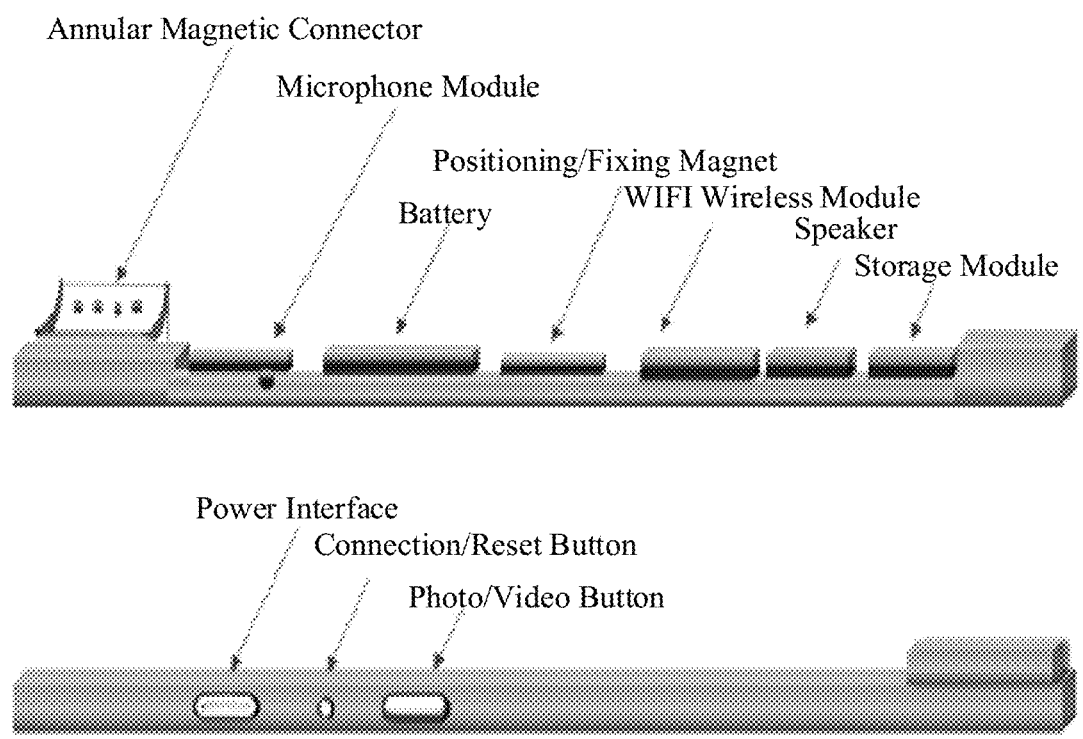
FIG. 13 is a schematic diagram of a modular structure of a base according to some embodiments of the present disclosure.

Referring to FIG. 13 for a modular schematic view of the base, a first function may include one or more of the following functions: a charging function, a storage function, a Wi-Fi connection function, a sound output function, a fixing function, a sound collection function, a photo and/or video function, a power receiving function, and a connection/reset function.

The base can supply power to the acquisition apparatus when the second interface and the third interface are connected. In this manner, a battery module may be built in a main body of the acquisition apparatus, and the base can charge the battery module of the acquisition apparatus main body. Alternatively, the acquisition apparatus main body does not have a built-in battery module. When the base provides power for the acquisition apparatus main body, the acquisition apparatus can perform multimedia data collection even if it is not connected to a processing apparatus. If a photo/video button is set on the acquisition apparatus, a user can collect the multimedia data by triggering a corresponding button, and the collected multimedia data can be remotely transmitted to the cloud, or the acquisition apparatus main body or the base has a storage function, thereby realizing storage of the multimedia data.

The charging function can be provided by a battery module, and the storage function can be provided by a storage unit module.

The base can be wirelessly connected to a home network or wirelessly connected to the cloud for a multimedia data transmission. For example, it can be connected with device terminals such as mobile phones and computers to check status of a home, and set up traditional surveillance cameras such as home alarms.

The WIFI connection function can be provided through a WIFI wireless module.

The sound output function is used to implement sound input to the collected multimedia data.

The sound output function can be provided by a speaker module.

A third fixing device may be disposed on the base for fixing the acquisition apparatus main body to the base.

The fixing function can be provided by a positioning/fixing magnet, and the positioning/fixing magnet is implemented as an optional implementation of the third fixing device.

A sound collector can be provided on the base to achieve sound collection.

The sound collection function can be provided by a microphone module, and the microphone module is implemented as the sound collector.

A photo/video button can be set on the base to control the acquisition apparatus main body for multimedia data collection.

A power interface can be provided on the base to receive the power provided by an external power source.

A connection/reset button can be placed on the base to control a wireless network connection of the base to other devices.

Figure 14:
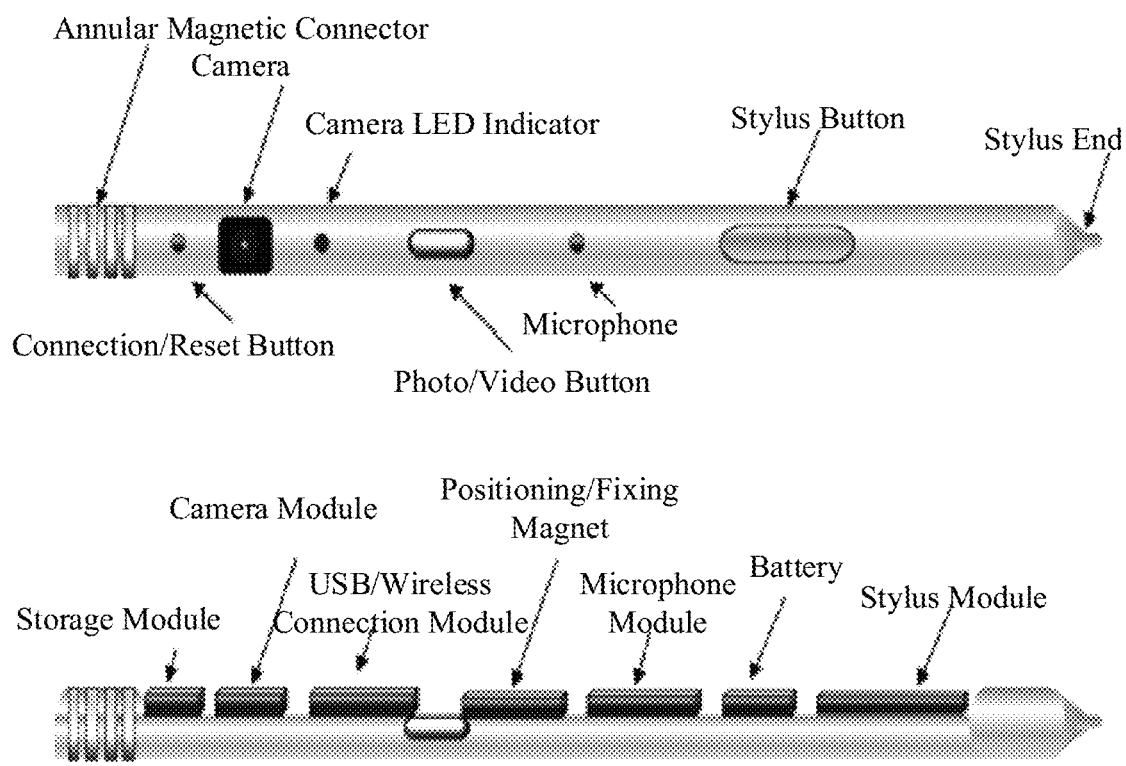
FIG. 14 is a schematic diagram of a modular structure of an acquisition apparatus according to some embodiments of the present disclosure.

As another implementation manner, some or all of the foregoing first functions may also be provided by the acquisition apparatus main body, and a functional module diagram of the acquisition apparatus may refer to FIG. 14.

In FIG. 14, an annular magnetic connector acts as an optional implementation of a second interface of an acquisition apparatus.

A camera is embodied as a second acquisition device of the acquisition apparatus.

A camera led indicator is used to indicate if the camera is working.

A photo/video button is used to control the acquisition apparatus to collect multimedia data when the acquisition apparatus is not connected to a processing apparatus.

A microphone is used to collect sound.

A stylus button is used to control the acquisition apparatus to implement a stylus function.

A storage module is configured to store multimedia data collected by the acquisition apparatus.

A camera module is configured to provide related functions to the camera.

A USB/wireless connection module is configured to provide a wired or wireless connection of the second interface to other interfaces.

A positioning/fixing magnet serves as an optional implementation of a second fixing device of the acquisition apparatus.

A microphone module is used to collect sound data.

A battery is used to supply power to the acquisition apparatus.

A stylus module is used to provide related functions for stylus operations of the acquisition apparatus.

FIG. 13 and FIG. 14 only provide the functions used by the base and the acquisition apparatus in a modular form, which does not constitute a limitation on the base and the acquisition apparatus. The base and the acquisition apparatus may only be used to provide some of the functions.

Figure 15:
FIG. 15 is a schematic structural view of an acquisition apparatus according to some embodiments of the present disclosure.

In some embodiments of the present disclosure, as shown in FIG. 15, an acquisition apparatus 200 has a first end 260. When the first end 260 is in contact with a sensing device of a processing apparatus, the sensing device can recognize a touch operation of the first end 260.

Optionally, the first end 260 of the acquisition apparatus 200 can implement a function of generating a trajectory through a function module that it has.

Under this structure, as an optional form, the acquisition apparatus can be in a form of a stylus, as shown in FIG. 15.

Figure 16A:
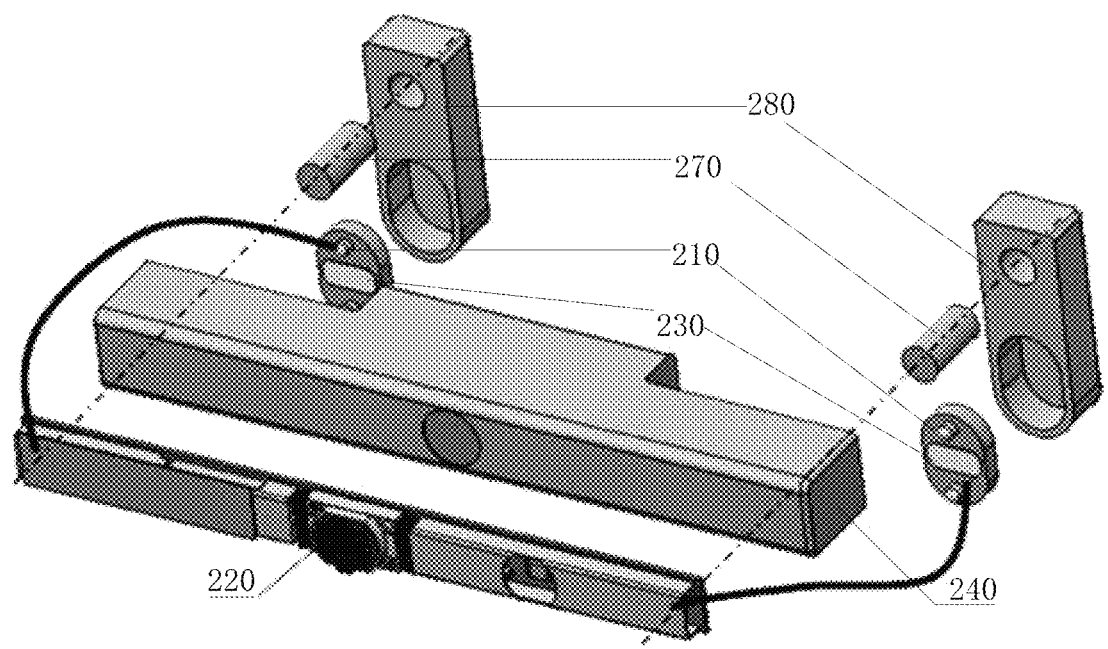
FIG. 16a is an exploded structural view of an acquisition apparatus according to some embodiments of the present disclosure.
Figure 16B:
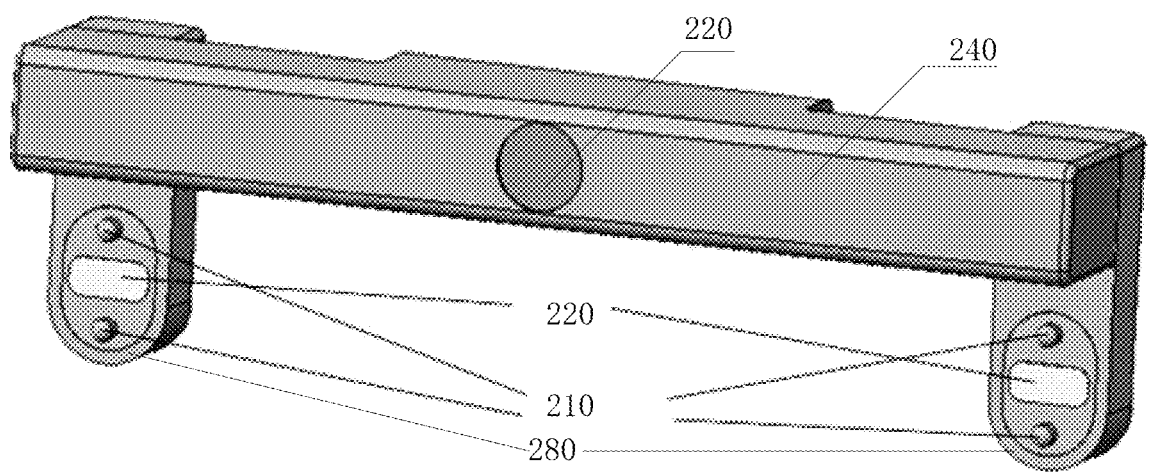
FIG. 16b is a schematic structural view of an acquisition apparatus with opened arms according to some embodiments of the present disclosure.
Figure 16C:
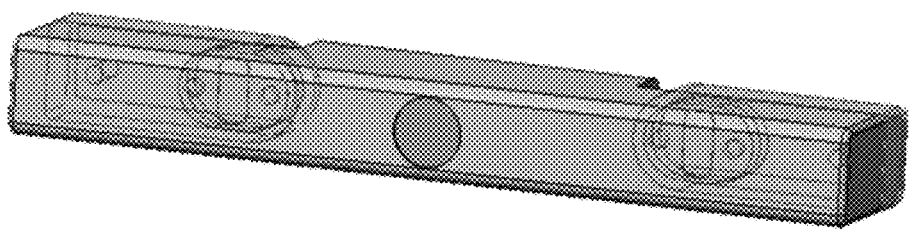
FIG. 16c is a schematic structural view of an acquisition apparatus with closed arms according to some embodiments of the present disclosure.

Some embodiments of the present disclosure are used to describe another optional configuration of an acquisition apparatus. As shown in FIGS. 16*a*-16*c*, the acquisition apparatus includes: a second interface 210, a second acquisition device 220, a second fixing device 230, an acquisition apparatus main body 240, a rotating shaft 270 and one or more rotating arms 280 rotatably connected to the acquisition apparatus main body 240 through the rotating shaft 270.

The second acquisition device 220 is disposed on the acquisition apparatus main body 240, and the second fixing device 230 is disposed on the rotating arms 280. In some embodiments, the second interface 210 can be a pin interface and is connected to the second acquisition device 220.

When the acquisition apparatus is fixed to a second plane of a processing apparatus by the second fixing device 230 and a first fixing device of the processing apparatus, the rotating arms 280 and the acquisition apparatus main body 240 are at a first preset angle. For example, the first preset angle may be 90° as shown in FIG. 16b.

When the acquisition apparatus is not fixed on the processing apparatus, the rotating arms 280 and the acquisition apparatus main body 240 may be at a second preset angle, as shown in FIG. 16c, for example, the second preset angle may be 0°. When the processing apparatus is provided with a receiving cavity for accommodating the acquisition apparatus, and the processing apparatus accommodates the acquisition apparatus, the rotating arms and the acquisition apparatus body may have a second preset angle, and the second preset angle may be 0°, a form as shown in FIG. 16c.

Figure 17A:
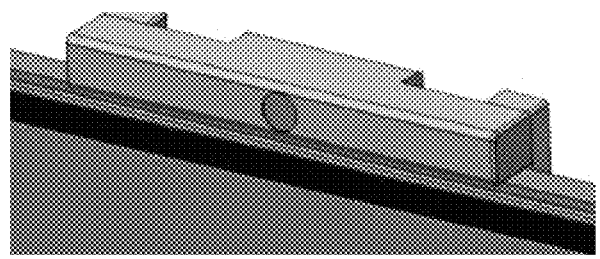
FIG. 17a is a front structural view of an acquisition apparatus fixed to a processing apparatus according to some embodiments of the present disclosure.
Figure 17B:
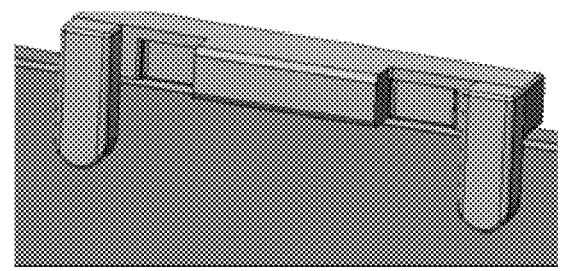
FIG. 17b is a rear structural view of an acquisition apparatus fixed to a processing apparatus according to some embodiments of the present disclosure.

In some embodiments of the present disclosure, a front structure for fixing an acquisition apparatus on a processing apparatus can refer to FIG. 17a, and a back structure for fixing the acquisition apparatus to the processing apparatus can refer to FIG. 17b.

Figure 18:
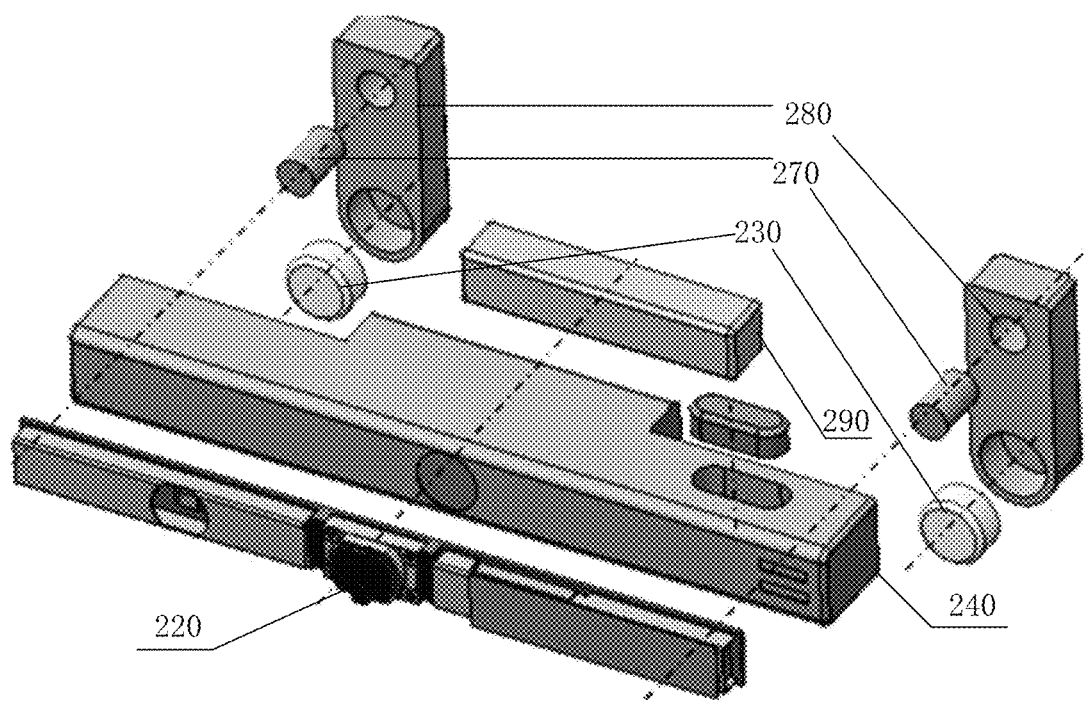
FIG. 18 is an exploded structural view of an acquisition apparatus according to some embodiments of the present disclosure.

Some embodiments of the present disclosure are used to describe another optional configuration of an acquisition apparatus. In some embodiments, as shown in FIG. 18, an acquisition apparatus may further include a battery module 290, and the battery module 290 is configured to supply power to a second acquisition device 220. In some embodiments, a second interface is a wireless interface, and thus is not shown in the figure.

Figure 19:
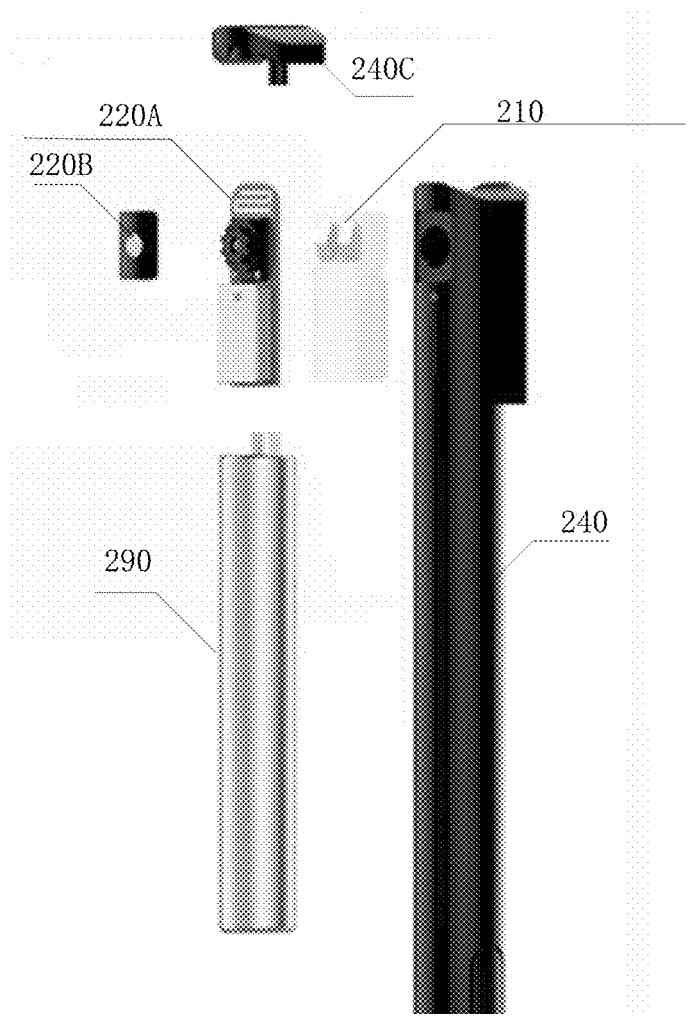
FIG. 19 is an exploded structural view of an acquisition apparatus according to some embodiments of the present disclosure.

Some embodiments of the present disclosure are used to describe another optional configuration of an acquisition apparatus. In some embodiments, as shown in FIG. 19, a camera module 220A and a lens module 220B constitute a second acquisition device. A battery module 290 can be connected to the second acquisition device, and power is supplied to the second acquisition device. A cover plate 240C may be disposed on an acquisition apparatus main body 240, and a second interface 210 may be a pin interface.

The various embodiments in the present disclosure are described in a progressive manner, and some embodiments focus on differences from other embodiments, and same similar parts between the various embodiments may be referred to each other. For a device disclosed in some embodiments, since it corresponds to the method disclosed in these embodiments, the description is relatively simple, and the relevant parts can be referred to the method part.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the broadest scope consistent with the principles and inventive features disclosed herein.

What is claimed is:

1. A processing apparatus, comprising:
a first main body, having a first plane and a second plane adjacent to the first plane;
a display device, disposed on the first plane;
a first fixing device; and
a first interface, the first interface being operating through the first fixing device, wherein the first interface is matched with a second interface of an acquisition apparatus in a form of a stylus having a pen body, the processing apparatus is configured to obtain multimedia data collected by the acquisition apparatus from the second interface after the acquisition apparatus, is detachably fixed to the second plane via a second fixing device, wherein:
the first fixing device is disposed on the first main body, and the second fixing device is removably affixed to the first fixing device, and
the acquisition apparatus includes a securing body on the pen body configured to detachably secure the pen body of acquisition apparatus to the second fixing device parallel to the second plane of the processing apparatus, and
the pen body hosts an image sensor, while the pen body is co-axially rotatably attached to the second fixing device such that a direction of the image sensor can be adjusted radially perpendicular to an axial direction of the pen body.

2. The apparatus according to claim 1, further comprising:
a first acquisition device, wherein the first acquisition device has a different acquisition function from a second acquisition device of the acquisition apparatus.

3. The apparatus according to claim 1, further comprising:
a second main body and a connector, wherein:
the connector is configured to connect the first main body and the second main body, and is configured to implement a change of a relative positional relationship between the first main body and the second main body;
the first main body includes a first side end and a second side end, the first side end is an end of the first main body away from the connector, and the second side end is an end of the first main body adjacent to the first side end; and
the first interface is disposed on the second plane, and the second plane corresponds to the first side end or corresponds to the second side end.

4. The apparatus according to claim 1, wherein:
the first main body has a first surface, wherein the first surface includes the first plane; and
a ratio of the first plane to the first surface exceeds a threshold.

5. The apparatus according to claim 1, wherein:
the processing apparatus is provided with a receiving cavity, wherein the receiving cavity is configured to accommodate the acquisition apparatus in response to the first interface being unmatched with the second interface.

6. The apparatus according to claim 1, wherein the first fixing device is of a ring shape.

7. A processing system, comprising:
a processing apparatus and an acquisition apparatus, wherein:
the processing apparatus includes: a first main body including a circuitry, a display device, a first fixing device, and a first interface, the first interface being operating through the first fixing device wherein the first main body has a first plane and a second plane adjacent to the first plane, and the display device is disposed on the first plane;
the acquisition apparatus in a form of a stylus having a pen body includes a second interface, the first fixing device is disposed on the first main body, and a second fixing device is removably affixed to the first fixing device, wherein, the acquisition apparatus includes a securing body on the pen body configured to detachably secure the pen body of acquisition apparatus to the second fixing device parallel to the second plane of the processing apparatus, the pen body hosts an image sensor, while the pen body is co-axially rotatably attached to the second fixing device such that a direction of the image sensor can be adjusted radially perpendicular to an axial direction of the pen body, and the first interface is configured to obtain multimedia data collected by the acquisition apparatus from the second interface after the acquisition apparatus is detachably fixed over the second plane.

8. The system according to claim 7, wherein:
the first fixing device and the second fixing device are configured to fix the acquisition apparatus after the first interface matches the second interface.

9. The system according to claim 7, wherein:
the acquisition apparatus further includes a base, wherein:
 the base is provided with a third interface; and
 after the second interface is connected to the third interface, the base is configured to provide the acquisition apparatus with one or more first functions that are different from an acquisition function of the acquisition apparatus to collect the multimedia data.

10. The system according to claim 9, wherein:
the one or more first functions include one or more selected from a charging function, a storage function, a Wi-Fi connection function, a sound output function, a fixing function, a sound collection function, a photo function, a video function, a power receiving function, and a reset function.

11. The system according to claim 7, wherein the second fixing device is of a ring shape.

* * * * *